C. C. PECK.
Amalgamator.

No. 210,465.  Patented Dec. 3, 1878.

Witnesses:
E. A. Hemmenway
C. H. Dodd

Inventor:
Charles C. Peck
by N. C. Lombard
Attorney.

UNITED STATES PATENT OFFICE.

CHARLES C. PECK, OF MELROSE, MASSACHUSETTS.

IMPROVEMENT IN AMALGAMATORS.

Specification forming part of Letters Patent No. 210,465, dated December 3, 1878; application filed September 11, 1878.

*To all whom it may concern:*

Be it known that I, CHARLES C. PECK, of Melrose, in the county of Middlesex and State of Massachusetts, have invented certain new and useful Improvements in Amalgamators, of which the following, taken in connection with the accompanying drawings, is a specification.

My invention is an improvement upon the machine described in Letters Patent No. 51,079, granted to me November 21, 1865; and consists, first, in a peculiar construction and arrangement of the devices for imparting to the pans an oscillating or vibratory motion about their axes at the same time that said axes are being moved through a circular path, and rising and falling, which will be best understood by reference to the description of the drawings.

It further consists in the use of a pan or pans made of copper, concavo-convex in form, and provided with a discharge-spout, the inner portion of which, at least, is made of iron.

It further consists in the use of one or more screw-hooks for securing the pan to the spider, as will be described.

Figure 1:
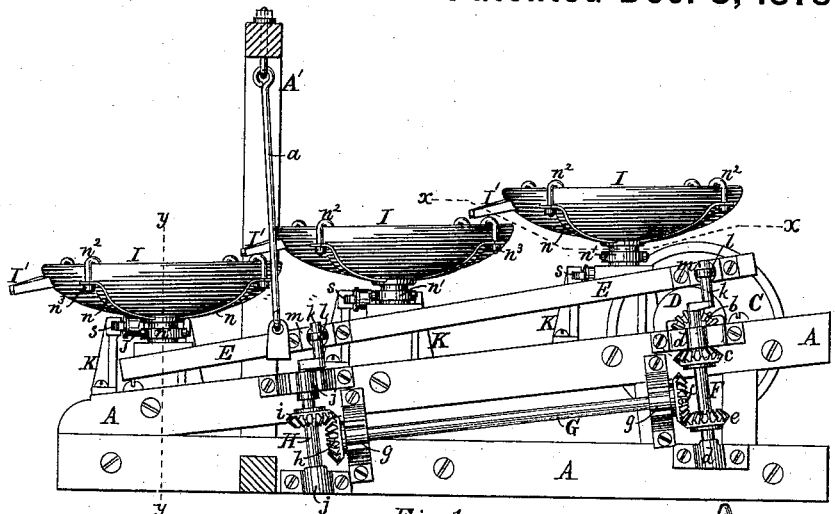
Figure 2:
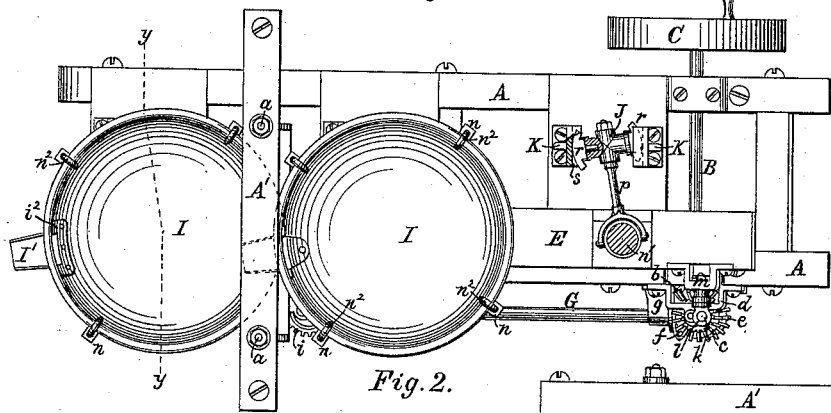
Figures 4, 5:
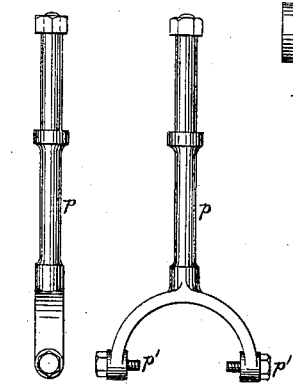
Figure 8:
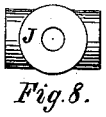
Figure 7:
Figure 6:
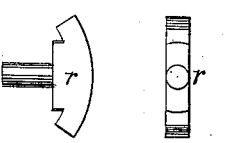
Figure 3:
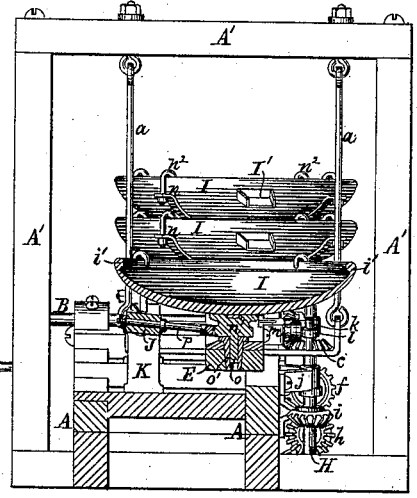

In the drawings, Figure 1 is a sectional side elevation of a machine embodying my invention. Fig. 2 is a plan, with the upper pan cut away on line $x$ $x$ in Fig. 1. Fig. 3 is a vertical transverse section on line $y$ $y$ on Figs. 1 and 2. Figs. 4, 5, 6, 7, 8, 9, and 10 are details of detached parts of the device for imparting to the pans an oscillating motion about its axis, drawn on an enlarged scale.

A is the main frame of the machine, made higher at one end than at the other end, as shown, and having mounted thereon, in suitable bearing near its highest end, the driving-shaft B, provided with the pulley C, by means of which and a suitable belt (not shown) a rotary motion may be imparted to said shaft. The shaft B is also provided with an eccentric-wheel, D, firmly secured thereon, and upon which the upper end of the inclined platform E rests, while its other end is suspended from the frame A' by means of the pendent rods $a$ $a$, as shown in Figs. 1 and 3. The shaft B has secured to its end a bevel-gear wheel, $b$, which engages with a similar wheel, $c$, secured upon the upright shaft F, mounted in bearings $d$ $d$, secured to the side of the frame A, as shown in Fig. 1. The shaft F has secured thereon another bevel-gear, $e$, which engages with and imparts motion to a similar gear-wheel, $f$, secured upon one end of the shaft G, mounted in bearings $g$ $g$, secured to the side of the frame A, the opposite end of said shaft G having secured thereon the bevel-gear wheel $h$, which meshes into and imparts motion to a similar gear-wheel, $i$, secured upon the shaft H, mounted in bearings $j$ $j$, with its axis parallel to the shaft F, and adapted to be revolved in the same direction and at the same speed as said shaft F. The shafts F and H are each provided at their upper ends with a crank-pin, $k$, which is embraced by the swiveling eye $l$, mounted in the stand $m$, secured to the edge of the platform E, all so arranged that a rotation of the shafts F and H will cause the platform E to be moved bodily in an endwise and a lateral direction, substantially in the same manner as described in Letters Patent No. 51,079, before cited. The platform E also has an up-and-down motion imparted to its upper end, causing it to rock or tilt endwise, by virtue of the eccentricity of the wheel D, substantially as described in the Letters Patent just cited.

I I are a series of pans, made concavo-convex, and provided around their upper edges with inwardly-projecting annular lips or ribs $i^1$, to prevent the swashing of the contents of the pans over their edges as they are operated. The pans I are supported upon arms $n$ $n$, radiating from the central hubs, $n^1$, each provided with the axial pintle or journal $o$, which is fitted to and has its bearing in the metallic bushing $o'$, set in the platform E in a vertical position, or perpendicular to the base of the machine. The pans I are secured in position on the arms $n$ by means of the hooks $n^2$ and nuts $n^3$, as clearly shown in Figs. 1 and 3.

Figure 9:
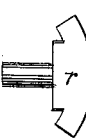
Figure 10:
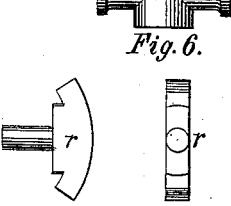

The hubs $n^1$ are each partially embraced by the forked end of the rod or lever $p$, which is secured thereto by the screw-pivots $p'$, in such a manner that said forked rod may oscillate about said pivots, the opposite end of said forked rod being fitted to and adapted to be partially rotated within the cross-head J, made in a cruciform shape, and having mounted in its two ends the curved shoes $r$ $r$, adapted to oscillate about an axis at right angles to the rod $p$, and to be reciprocated in the grooves $s$ $s$ of the stands K, the outer edges of said shoes being curved concentric with the center of the cross-head J, as shown in Figs. 2 and 9, so that as the platform E is moved endwise, carrying the pans I therewith, and the forked ends of the rods $p$ are moved in the same direction, and the cross-heads J assume positions at an angle to the slide-grooves $s$, the shoes $r\ r$ are still free to be moved along said grooves as the platform is moved laterally, and by virtue of the swinging or vibrating action of the rod $p$, caused by the movement of the platform E, the pans are oscillated about their own axes. This method of obtaining an oscillating motion of the pans, in addition to their up-and-down, back-and-forth, and lateral motions, is a great improvement over that described in the Letters Patent heretofore cited, for the reason that it is much more effective and much less liable to get out of order.

The body of the pans I are in practice made of copper, with which quicksilver readily unites to form an amalgam, and are each provided with a spout, I', made preferably of Russia iron, or any other metal with which quicksilver does not readily amalgamate, for the purpose of preventing the escape of the quicksilver from the pans, as would be the case were the pan and spout all made of copper and no other means resorted to to prevent such escape.

The same end, however, may be attained by making the pan and spout both of copper, and surrounding the inner end of the spout or the exit-orifice with a Russia-iron band or lining, which serves as an effectual abutment to prevent the quicksilver escaping through the spout. This modified form of construction is shown in the left-hand pan in Fig. 2, where $i^2$ is the band of iron surrounding the exit-orifice, and serving as a bridge to keep back the quicksilver.

What I claim as new, and desire to secure by Letters Patent of the United States, is—

1. In an amalgamating apparatus, the combination of the endwise and laterally moving platform E, one or more pan-supporting spiders, $n\ n^1$, journaled in said platform, the forked rod $p$, cross-head J, curved shoes $r\ r$, and the fixed stands K, provided with grooves $s$, substantially as and for the purposes described.

2. The combination of an amalgamating-pan made of copper, and a discharge spout or orifice made wholly or in part of iron, substantially as and for the purposes described.

3. In combination with the pan I and spider $n\ n^1$, the screw-hook $n^2$ and nut $n^3$, all constructed, arranged, and adapted to operate substantially as and for the purposes described.

Executed at Boston, Massachusetts, this 7th day of September, A. D. 1878.

CHARLES C. PECK.

Witnesses:
N. C. LOMBARD,
E. A. HEMMENWAY.